United States Patent Office 3,507,852
Patented Apr. 21, 1970

3,507,852
EXTRACTION ESTERIFICATION PROCESS
William Kuchmy, 1593 Plank Road,
Webster, N.Y. 14580
No Drawing. Filed Jan. 12, 1968, Ser. No. 697,316
Int. Cl. C08b *3/06, 3/20, 19/10*
U.S. Cl. 260—209.6                              3 Claims

ABSTRACT OF THE DISCLOSURE

A process for the extraction and esterification of cellulosic and other products, using an azetropic mixture of a hydrocarbon and an acid anhydride as a combined esterifying agent and extracting solvent. The preferred solvent ingredients are heptane and acetic anhydride, and materials which may be extracted and esterified include cotton linters (either purified or raw) and milkweed fibers, and polyuronic alginate materials. The solvent in hot liquid phase is brought into contact with the material being extracted (which becomes the esterified product) and then goes to a still where the solvent is boiled, the solvent vapors are condensed and again brought into contact with the material being extracted, and so on. The boiling, condensation of vapors, contact with material being extracted, and return to the still are preferably carried out in a closed circuit apparatus, to provide a repetitive cycle continued as long as desired.

BACKGROUND OF THE INVENTION

In the prior processes for extraction and esterification, there is frequently difficulty in separating the solvent from the extracted material. Also, when prior extraction processes are used with cellulosic fibrous material, the fibers are frequently damaged so that they cannot be effectively used.

It is an object of the present invention to provide an improved process, particularly but not exclusively useful in connection with cellulosic fibrous material, which results in adequate extraction of impurities and esterification of the material without damage to the fibers, and in which the extracted material and the solvent can be separated from each other more easily than in the prior art.

It is another object of the invention to use as solvent a mixture of ingredients which will both swell the fibers in order to facilitate the desired extraction and esterification reaction, and esterify the product being extracted.

A further object of the invention is the provision of an improved solvent for extracting material from cellulosic fibers and other materials, the solvent comprising ingredients which form an azeotrope, thus enabling the solvent to be recovered easily from the extracted material since the azeotrope boils at a lower boiling point than any of its ingredients and thus can be more easily evaporated to dry the esterified product.

DESCRIPTION OF THE PREFERRED EMBODIMENTS

The process of the present invention is useful in making esters of cellulose, polyuronic acids, and other hydroxyl-containing substances, and utilizes extraction with a mixture of a hydrocarbon and an acid anhydride. The preferred hydrocarbon is heptane but other closely related hydrocarbons may be used, such as hexane and octane. The preferred acid anhydride is acetic anhydride. Others that may be used are propionic anhydride and crotonic anhydride, but the latter has an unpleasant odor making it undesirable from that standpoint. Butyric anhydride does not seem to give good results. Acetic anhydride is usually much more suitable than any of the other anhydrides, for purposes of the present process.

The mixture of the hydrocarbon and the acid anhydride (with a catalyst, if necessary) forms an azeotropic mixture or azeotrope. The mixture is boiled, the vapors are condensed, and the hot condensate is brought into contact with the cellulose or other material being esterified. The solvent condensate, after contact with the material being esterified, flows back to the still, is again boiled, the vapors are again condensed and the condensate again brought into contact with the material being extracted, and so on, the process being a repetitive cycle in a closed circuit, continued as long as desired in order to bring the extraction and esterification to the desired point.

On a laboratory scale, the process is preferably carried on with the use of a Soxhlet extractor, which is a well-known item of laboratory equipment. (See, for example, illustration of a Soxhlet extractor on p. 119 of the book "The Chemistry of Organic Componds," by James Bryant Conant, published by The Macmillan Company, New York, N.Y., 1939.) All of the examples here given relate to carrying out the process with the use of a Soxhlet extractor equipped with a round bottom flask having a capacity of 500 milliliters (ml.) heated with an electric heater. A small quantity of glass wool was placed in the bottom of the Soxhlet extractor tube, to form a support for the material being esterified and to keep such material from siphoning into the distilling flask.

The boiling point of heptane is approximately 98.5° C., the boiling point of acetic anhydride is 140° C., and the boiling point of the azeotrope of heptane and acetic anhydride is approximately 93° C. By the use of such azeotrope, according to the present invention, it is much easier to remove the acetic anhydride from the esterified material at the axeotropic temperature of 93° C., than at the anhydride boiling point of 140° C.

EXAMPLE 1

3.0 grams of purified cotton linters are soaked in acetic acid for one hour. They are then removed from the acid, and the acid is wrung out of them. The linters are then placed in the Soxhlet extractor, lying on the previously mentioned bed of glass wool. A mixture of 250 mil. of heptane and 75 ml. of acetic anhydride is placed in the 500 ml. round bottom flask of the Soxhlet extractor, and the flask is heated to boil the contents for 7 hours. The cotton linters are then removed from the Soxhlet extractor, and are dried for one hour in a drying chamber at 100° C. Then they are washed with hot distilled water until free of acid, and the washed linters are then dried again for three hours in a drying chamber at 100° C.

Upon analysis, the cotton linters are found to have an apparent acetyl value of 4.3%. It is seen that when no catalyst is used, the amount of esterification is quite small, but some esterification is produced.

EXAMPLE 2

3.0 grams of purified cotton linters are placed for one hour in 20 ml. of acetic acid containing 0.08 gram of concentrated sulphuric acid. The linters are then removed from the acid and wrung out, and placed in the Soxhlet extractor. 250 ml. of heptane and 75 ml. of acetic acid are placed in the 500 mm. capacity round bottom flask of the Soxhlet extractor, and are heated to boil for 4 hours. The esterified cotton linters are then removed from the extractor, dried for one hour in a drying chamber at 100° C., then washed with hot distilled water until free from acid, and again dried for 3 hours in a drying chamber at 100° C.

Upon analysis, the product (i.e., the esterified cotton linters) has an apparent acetyl value of 44.5%, and a sulphur content of 0.001%, and a melting point of 310° C. with char. The product is soluble in methylene chloride.

It is dissolved in methylene chloride, which is then poured onto a glass plate, from which the methylene chloride evaporates, leaving a skin or sheet of the product. The skin is clear and good, the sulphur content being low. Such a skin may be used as a transparent membrane for any of the uses for which transparent sheeting is used.

EXAMPLE 3

The same as Example 2, except that 0.006 g. of perchloric acid is used as the catalyst in place of the 0.08 g. of sulphuric acid in Example 2, and except that extraction is continued for 5 hours instead of 4 hours.

Upon analysis, the esterified product has an apparent acetyl value of 44.3%, a melting point of 300° C. clear (that is, without appreciable char), and decomposes at 315° C. The product is extremely soluble in methylene chloride, and the skin formed from the methylene chloride solution (in the same manner as described in connection with Example 2) is clear but rather brittle, being appreciably more brittle than the skin resulting from Example 2.

EXAMPLE 4

The same as Example 3 except that the perchloric acid catalyst is used only to the extent of 0.003 g. instead of 0.006 g. Analysis of the product shows an apparent acetyl value of 26.2%. The product has very good color stability when heated, much better than the original linters. The product is more resistant to water and heat degradation than the original purified cotton linters. The esterified linters are suitable for matting or weaving or felting into a sheet, but are not appreciably soluble in the methylene chloride solvent, so could not be used to form a transparent skin as in Examples 2 and 3.

EXAMPLE 5

3.0 g. of purified cotton linters are soaked for one hour in 10 ml. of distilled water containing 0.06 g. of concentrated sulphuric acid. The linters are removed from the liquid bath, and dried at room temperature, and are then placed in the Soxhlet extractor and subjected to the extraction and esterification step, the same as described in the previous examples, for a period of 3 hours. The esterified linters are then air dried at room temperature, and washed with hot distilled water until free from acid. The washed esterified linters are then placed in 50 ml. of methylene chloride, and shaken for one hour. The solution is then filtered through glass wool, and poured onto a glass plate and allowed to evaporate. 2.0 g. of skin is formed upon evaporation, which skin is good, clear, and strong. The insoluble partially acetylated fraction of the product, amounting to 0.5 g., is white and fibrous. This example shows that the catalyst can be added in water.

EXAMPLE 6

10.0 g. of purified cotton linters are soaked for one hour in 100 ml. of acetic acid. The linters are then removed from the lactic acid and wrung out. The linters are then placed in 100 ml. of acetic anhydride, and soaked therein for one hour, then removed therefrom and wrung out. 10.0 ml. of acetic anhydride containing 0.035 g. of concentrated sulphuric acid are added to the linters and mixed thoroughly therewith. The mixtures of linters and the acetic anhydride with sulphuric acid are then placed in the Soxhlet extractor, and extracted for 3 hours, using the above described mixture of heptane and acetic anhydried the same as in the previous examples. The esterified product is air dried, then washed with hot distilled water until free from acid, then dried for 3 hours in a drying chamber at 100° C. The dried product is then placed in 100 ml. of methylene chloride, and shaken for 3 hours. The solution is then filtered through glass wool.

This example, starting with 10 g. of purified cotton linters, yields 7.0 g. of cellulose triacetate (soluble in the methylene chloride) and 3.0 g. of partially acetylated cellulose, not soluble in methylene chloride. The soluble fraction (cellulose triacetate) is found upon analysis to have an apparent acetyl value of 44.2%, and a melting point of 300° C. The skin formed from this fraction was clear and good. The insoluble fraction (partially acetylated cellulose) has an apparent acetyl value of 27.8%.

EXAMPLE 7

3.0 g. of raw cotton linters are placed for one hour in a bath consisting of 20 ml. of acetic acid containing 0.08 g. of concentrated sulphuric acid. The linters are removed from the bath after one hour and the excess liquid wrung out. Then the linters are placed in the Soxhlet extractor and extracted for four hours with the previously described mixture of heptane and acetic anhydride. The product is removed from the extractor after four hours, is air dried at room temperature, then washed with hot distilled water until free from acid, then dried for three hours in a drying chamber at 100° C. The dried product is then dissolved in methylene chloride, filtered through glass wool, and poured on a plate to allow the methylene chloride to evaporate. The skin or sheet formed on the plate upon evaporation of the methylene chloride solvent, is removed from the plate by pouring hot water on the plate. The skin is then dried for one hour at 100° C.

Analysis of the skin shows an apparent acetyl value of 44.3%, and a melting point of 300° C. It decomposes at 315° C. The skin is clear, but somewhat yellow in color. This example shows that the process of the present invention may be used with raw cotton linters, as well as with the purified cotton linters used in the previous examples.

EXAMPLE 8

Fibers are removed from milkweed seed, by soaking in water and picking off the seed. 10.0 g. of such fibers are first soaked in acetic acid for one hour, then wrung out to remove the excess acid. Then the fibers are placed in a bath consisting of 20 ml. of acetic acid containing 0.06 g. of concentrated sulphuric acid. The bath containing the fibers is stirred for one hour. Then the fibers are removed from this bath, and wrung out to remove excess liquid. They are then placed in the Soxhlet extractor, and extracted with the previously described mixture of heptane and acetic anhydride for three hours. Then they are removed from the extractor, dried at room temperature, then washed with distilled water until free of acid, and again dried for three hours in a drying chamber at 100° C.

The fibers are then removed from the drying chamber, and examined carefully. It is found that the esterification has not destroyed the physical characteristics of these fibers. They are still soft and very light, but are much more water resistant than the original fibers before the esterification. Also, they have better color stability when heated.

The fibers are then dissolved in methylene chloride, and poured on a plate to obtain a skin or film by evaporation of the methylene chloride, as in the previous examples. However, this skin is found to be of poor quality and very brittle. The conclusion is reached that the milkweed fibers, when esterified according to the present process, would be very suitable for use as thermal insulating material, especially because of the increased water resistance, but would not be particularly suitable as a source for making a transparent skin or film.

EXAMPLE 9

30.0 g. of sodium alginate powder is dissolved in distilled water, and alginic acid is then precipitated by adding to the distilled water 10% of sulphuric acid, by volume. The alginic acid precipitate is removed from the bath and washed with distilled water, then washed with acetic acid, and filtered.

10 g. of the alginic acid, after being washed as above with acetic acid, is added to 10 ml. of acetic acid containing 0.04 g. of concentrated sulphuric acid, and is thoroughly mixed therewith. The mixture is then placed in the Soxhlet extractor, and extracted with the mixture of heptane and acetic anhydrid for three hours. The alginic acid is removed from the extractor, dried at room temperature, washed with distilled water, and again dried for three hours in a drying chamber at 100° C.

The product, upon analysis, is found to have 18.7% of carboxyl, and an apparent acetyl value of 30.6%. It is soluble in a mixture of 80% acetone and 20% water, by volume.

EXAMPLE 10

Same as Example 9, except that 0.02 g. of perchloric acid is used in place of the 0.04 g. of concentrated sulphuric acid, and except that after removal from the Soxhlet extractor, the product is dried for two hours at 90° C., then washed with distilled water until free from acid, and then dried again for two hours at 100° C. Upon analysis, the product is found to have 16.8% carboxyl, and an apparent acetyl value of 33.5%, and is soluble in a mixture of acetone 80% and water 20%, by volume.

The products of both Examples 9 and 10 may be formed into skins or films, by pouring the acetone-water solutions on plates, and evaporating. In both cases (Examples 9 and 10) the skins formed are clear, and are somewhat adhesive. Due to the high carboxyl content of these products, they are useful as a cation exchange material, and also as a backing material for supporting other products, the backing material being soluble in alkali and thus easily removable. Also, the products of these Examples 9 and 10 are suitable for use as molding powders, and as starting materials for making threads or filaments.

In all of the foregoing specific examples, the azeotropic mixture of heptane and acetic acid has been boiled in the flask of the Soxhlet extractor, and the vapor has been condensed and the hot liquid condensate has come into contact with the material being esterified. The boiling of the azeotropic mixture has been done merely for laboratory convenience. The same results may be obtained by providing a supply of hot azeotropic mixture of the above ingredients, initially formed elsewhere, and pumping this hot liquid to cause it to flow over the material being esterified. The important point, in this connection, is the prolonged contact between the material being esterified and the azeotropic esterifying agent in hot liquid phase, regardless of whether this hot liquid phase is the result of condensation from vapor phase, or whether there is no vaporization at this stage of the process and the liquid is merely being supplied from a hot reservoir thereof, at a temperature slightly below the boiling point.

In several of the examples, methylene chloride has been mentioned as a solvent for the estrified product. Other solvents may be used, e.g., chloroform, also pyridine if used hot, at about 80° C.

In addition to various uses of the esterified products already mentioned, the partially acetylated or esterified products may be used for making paper having increased water resistance and wet strength. The fully acetylated or esterified products not only may be used in making skins or films, as already mentioned, but also may be dissolved in solvents and extruded through fine nozzles to make threads or filaments.

The process provides a relatively cheap way of esterifying various materials. It does not require large quantities of water for washing the fibers or other esterified products, washing in moderate quantities of water being sufficient. The use of an esterfying agent in an azeotropic mixture having a lower boiling point than that of the esterifying agent itself, facilitates final separation of the residue from the esterified product, less heating being required to vaporize and drive off the residue of the esterifying agent. The inclusion in the azeotropic mixture of a hydrocarbon which has a swelling effect on the fibers, facilitates esterification when fibers are being treated, since the esterifying agent can attack the fibers more readily when they are swollen.

It is to be understood that the disclosure is given by way of illustrative example only, rather than by way of limitation.

What is claimed is:

1. A process for the extraction and esterification of carbohydrate materials using an azeotropic mixture of a hydrocarbon and an acid anhydride as a combined esterifying agent and extracting solvent which comprises bringing said carbohydrate material into prolonged contact with said azeotropic mixture in the presence of a catalytic amount of sulphuric acid or perchloric acid, draining azeotropic mixture from the treated material after esterification thereof, and heating the esterified material to a temperature above the boiling point of the azeotropic mixture but below the boiling point of the esterifying agent alone, to vaporize and drive off remaining traces of the esterifying agent.

2. The process of claim 1, wherein said acid anhydride is acetic anhydride and said hydrocarbon is heptane.

3. The process of claim 1, wherein said carbohydrate material to be esterified is a material selected from the class consisting of cotton linters, milkweed fibers, and polyuronic alginate materials.

References Cited

UNITED STATES PATENTS

| | | | |
|---|---|---|---|
| 2,403,707 | 7/1946 | Cunningham et al. | 260—209.6 |
| 2,607,771 | 8/1952 | Groombridge et al. | 260—227 |
| 2,844,575 | 7/1958 | Wells | 260—227 |
| 2,860,132 | 11/1958 | White et al. | 260—227 |
| 3,025,128 | 3/1962 | Finlayson et al. | 260—227 |
| 3,037,902 | 6/1962 | Fahey et al. | 260—227 |
| 3,041,329 | 6/1962 | Campbell et al. | 260—227 |
| 3,047,561 | 7/1962 | Crane | 260—227 |
| 3,215,490 | 11/1965 | Fraizy et al. | 260—227 |

DONALD E. CZAJA, Primary Examiner

R. W. GRIFFIN, Assistant Examiner

U.S. Cl. X.R.
260—209, 227